United States Patent
Roy et al.

(10) Patent No.: US 11,322,771 B2
(45) Date of Patent: May 3, 2022

(54) FUEL CELL TIE ROD ISOLATOR

(71) Applicant: DOOSAN FUEL CELL AMERICA, INC., South Windsor, CT (US)

(72) Inventors: Donald Roy, Enfield, CT (US); Eric O'Brien, Tolland, CT (US)

(73) Assignee: HyAxiom, Inc., South Windsor, CT (US)

( * ) Notice: Subject to any disclaimer, the term of this patent is extended or adjusted under 35 U.S.C. 154(b) by 242 days.

(21) Appl. No.: 16/729,612

(22) Filed: Dec. 30, 2019

(65) Prior Publication Data

US 2021/0202974 A1   Jul. 1, 2021

(51) Int. Cl.
*H01M 8/248*   (2016.01)
*H01M 8/0258*   (2016.01)
*H01M 8/0271*   (2016.01)

(52) U.S. Cl.
CPC .......... *H01M 8/248* (2013.01); *H01M 8/0258* (2013.01); *H01M 8/0271* (2013.01)

(58) Field of Classification Search
CPC ... H01M 8/248; H01M 8/0258; H01M 8/0271
See application file for complete search history.

(56) References Cited

U.S. PATENT DOCUMENTS

| | | | |
|---|---|---|---|
| 3,523,397 A | * | 8/1970 | Carey .................. B65B 11/52 53/397 |
| 6,190,793 B1 | | 2/2001 | Barton et al. |
| 2016/0372778 A1 | | 12/2016 | Hotta et al. |

FOREIGN PATENT DOCUMENTS

| | | |
|---|---|---|
| CN | 209804810 U | 12/2019 |
| JP | 2006040716 A | 2/2006 |
| JP | 2018055887 A | 4/2018 |
| KR | 20090113561 A | 11/2009 |

OTHER PUBLICATIONS

International Search Report and Written Opinion for International Application No. PCT/US2020/065603 dated Mar. 30, 2021.

* cited by examiner

*Primary Examiner* — Helen Oi K Conley
(74) *Attorney, Agent, or Firm* — Carlson, Gaskey & Olds, P.C.

(57) ABSTRACT

A fuel cell includes a fuel cell stack. A pressure plate is arranged on one side of the fuel cell stack. The pressure plate includes a hole, and a tie rod assembly has a tie rod received in the hole. A nut with a conical surface is secured to the tie rod. An isolator is arranged in the hole between the tie rod assembly and the pressure plate. The isolator has a conical portion, and the conical surface engages the conical portion to provide a conical interface. The tie rod assembly applies a clamp load on the fuel cell stack via the conical interface.

16 Claims, 3 Drawing Sheets

FUEL CELL TIE ROD ISOLATOR

BACKGROUND

One type of fuel cell configuration utilizes a fuel cell stack having multiple cells arranged one on top of another. Each cell includes cathode and anode electrodes that include various other components, which depend upon the type of fuel cell. The fuel cell stack is clamped together by pressure plates to provide overall structural integrity to the fuel cell as well as prevent gases from escaping between the cell stack elements.

In one type of fuel cell, multiple tie rod assemblies are fastened to the pressure plates to apply a clamp load on the fuel cell stack. It may be desirable to electrically isolate the pressure plates from one another, which may be accomplished by electrically isolating the tie rod assembly from the pressure plate.

One example arrangement includes spacer arranged on an outside of a pressure plate and in alignment with a hole in the pressure plate. A dielectric tube passes through the spacer and the corresponding hole in the pressure plate. A flat, dielectric washer, which is spaced from and discrete from the dielectric tube, is arranged on top of the spacer. A threaded tie rod passes through the dielectric washer and tube, and a nut is secured to the tie rod in abutment with the dielectric washer. The spacer, nut, and tie rod extend a significant distance beyond the outer surface of the pressure plate.

SUMMARY

In one exemplary embodiment, a fuel cell includes a fuel cell stack. A pressure plate is arranged on one side of the fuel cell stack. The pressure plate includes a hole, and a tie rod assembly has a tie rod received in the hole. A nut with a conical surface is secured to the tie rod. An isolator is arranged in the hole between the tie rod assembly and the pressure plate. The isolator has a conical portion, and the conical surface engages the conical portion to provide a conical interface. The tie rod assembly applies a clamp load on the fuel cell stack via the conical interface.

In a further embodiment of any of the above, the conical portion engages the pressure plate in the hole.

In a further embodiment of any of the above, the isolator has a cylindrical portion extending from a narrow end of the conical portion and through the hole. The tie rod is disposed in the conical and cylindrical portions.

In a further embodiment of any of the above, the conical and cylindrical portions respectively have a conical portion terminal end and a cylindrical portion terminal end. At least one of the conical portion terminal end and the cylindrical portion terminal end extends from the hole and beyond an exterior surface of the pressure plate to provide electrical isolation between the tie rod assembly and the pressure plate.

In a further embodiment of any of the above, both of the conical portion terminal end and the cylindrical portion terminal end extend from the hole and beyond an exterior surface of the pressure plate.

In a further embodiment of any of the above, the nut is arranged beneath the conical portion terminal end.

In a further embodiment of any of the above, the tie rod has a threaded end secured to the nut, and the nut is arranged interiorly of the conical portion terminal end.

In a further embodiment of any of the above, the isolator is plastic and is configured to provide electrical isolation between the tie rod assembly and the pressure plate.

In a further embodiment of any of the above, the fuel cell includes another pressure plate that is arranged on another side of the fuel stack assembly. The other pressure plate applies the clamp load on the fuel cell stack via the tie rod assembly.

In another exemplary embodiment, a fuel cell includes a fuel cell stack. A pressure plate is arranged on one side of the fuel cell stack in which the pressure plate has a hole. A tie rod assembly has a tie rod received in the hole, and a nut with a conical surface is secured to the tie rod. The tie rod assembly applies a clamp load on the fuel cell stack via the conical nut.

In a further embodiment of any of the above, an isolator is arranged in the hole between the tie rod assembly and the pressure plate. The isolator has a conical portion, and the conical surface engages the conical portion to provide a conical interface.

In a further embodiment of any of the above, the isolator has a cylindrical portion extending from a narrow end of the conical portion and through the hole. The tie rod is disposed in the conical and cylindrical portions.

In a further embodiment of any of the above, the conical and cylindrical portions respectively have a conical portion terminal end and a cylindrical portion terminal end. At least one of the conical portion terminal end and the cylindrical portion terminal end extends from the hole and beyond an exterior surface of the pressure plate to provide electrical isolation between the tie rod assembly and the pressure plate.

In a further embodiment of any of the above, both of the conical portion terminal end and the cylindrical portion terminal end extend from the hole and beyond an exterior surface of the pressure plate.

In a further embodiment of any of the above, the nut is arranged beneath the terminal end of the conical portion terminal end.

In a further embodiment of any of the above, the tie rod has a threaded end secured to the nut, and the nut is arranged interiorly of the conical portion terminal end.

In a further embodiment of any of the above, the isolator is plastic and is configured to provide electrical isolation between the tie rod assembly and the pressure plate.

In a further embodiment of any of the above, the conical portion engages the pressure plate in the hole.

In a further embodiment of any of the above, the fuel cell includes another pressure plate that is arranged on another side of the fuel stack assembly. The other pressure plate applies the clamp load on the fuel cell stack via the tie rod assembly.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

Figure 1:
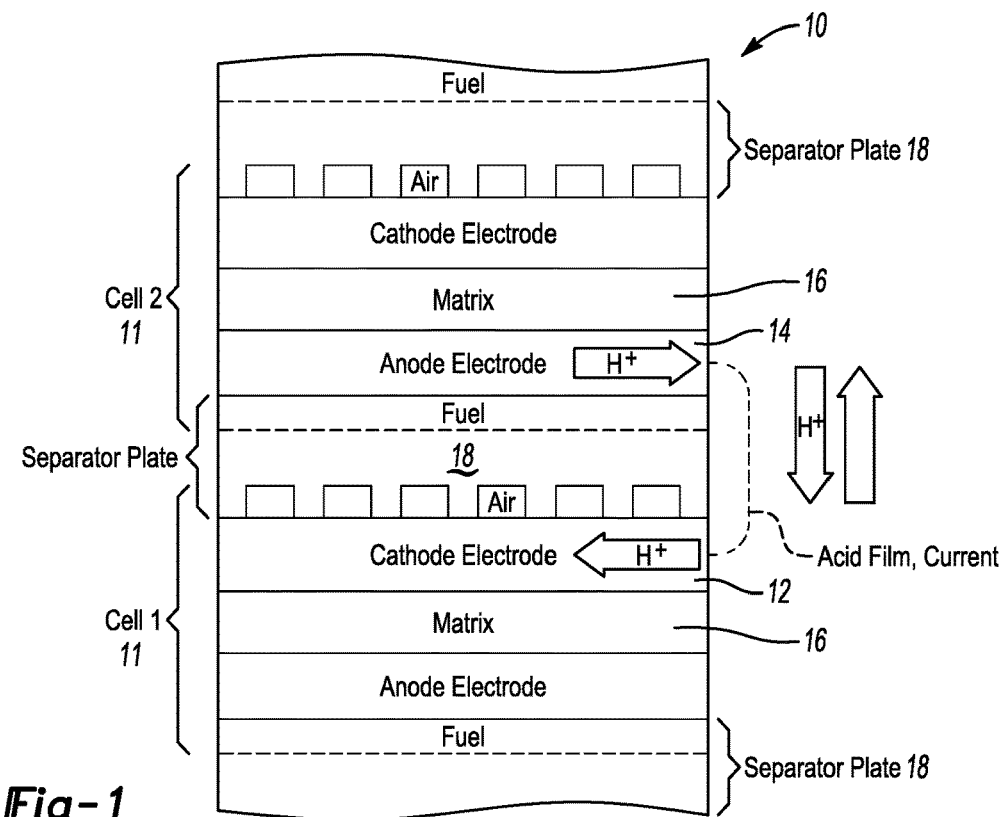
FIG. 1 is a schematic view of multiple cells in a fuel cell stack of a fuel cell.
Figure 2:
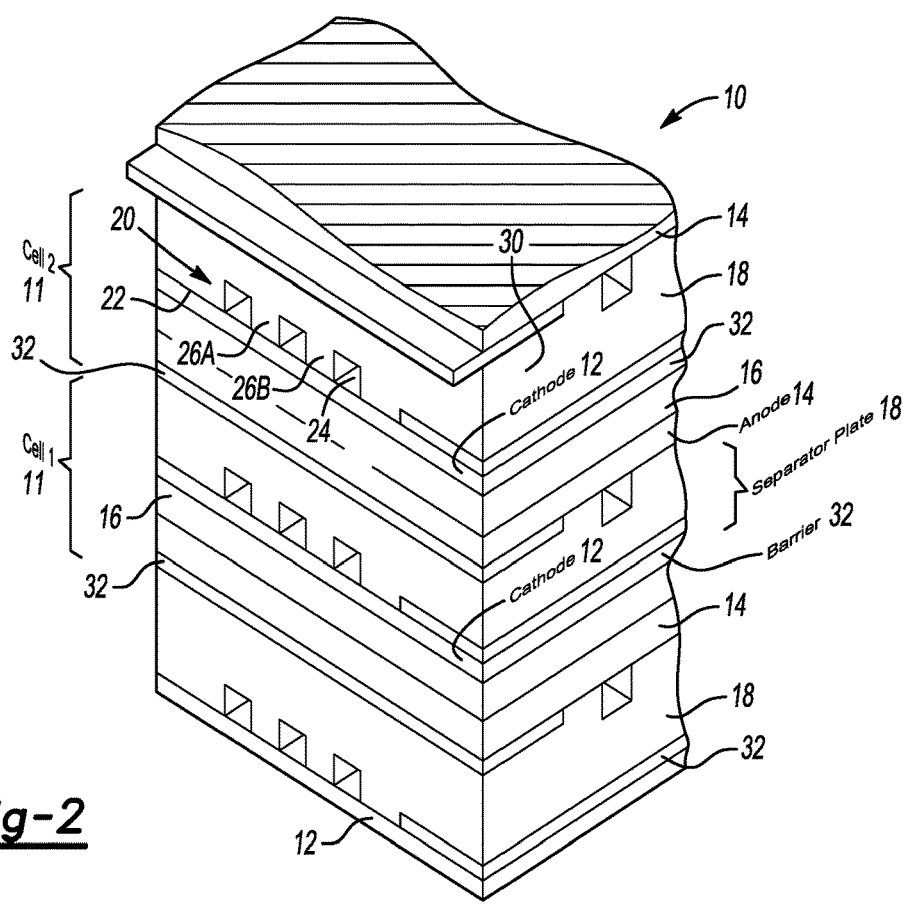
FIG. 2 is a schematic perspective view of the fuel cell stack shown in FIG. 1.

FIGS. 1 and 2, illustrate portions of a phosphoric acid fuel cell stack 10 of fuel cells 11. It is noted that the simplified schematic of FIG. 2 includes a cathode electrode 12 of a first fuel cell 11 ("Cell 1" of FIG. 1) and an anode electrode 14 of an adjoining second cell 11 ("Cell 2" of FIG. 1). As shown in FIG. 1, each fuel cell also includes a matrix 16 containing a liquid acid electrolyte. The stack 10 is illustrative, and the disclosed tie rod assembly can be used with other types of fuel cells.

A separator plate assembly 18 is secured between the cathode electrode 12 of one cell 11 (e.g., Cell 1) and the anode electrode 14 of an adjacent cell 11 (e.g., cell 2). Each separator plate assembly 18 defines a first flow field 20, such as a cathode flow field, adjacent a first contact surface 22 of the separator plate assembly 18. The first flow field 20 includes at least one flow channel 24 defined between ribs 26A, 26B of the separator plate assembly 18 so that the at least one flow channel 24 extends inwardly from the first contact surface 22 and so that the first contact surface 22 contacts the adjacent cathode electrode 12 to direct an oxidant reactant stream adjacent the cathode electrode 12.

The separator plate assembly 18 comprises a land region 28 shown in FIG. 2 extending along the first contact surface 22 between an edge 30 of the separator plate assembly 18 and the adjacent flow channel 24 and extending parallel to the flow channels 24. A barrier 32 extends from the edge 30 of the separator plate assembly 18 all or a portion of the distance between the edge 30 and the adjacent flow channel 24.

Figure 3:
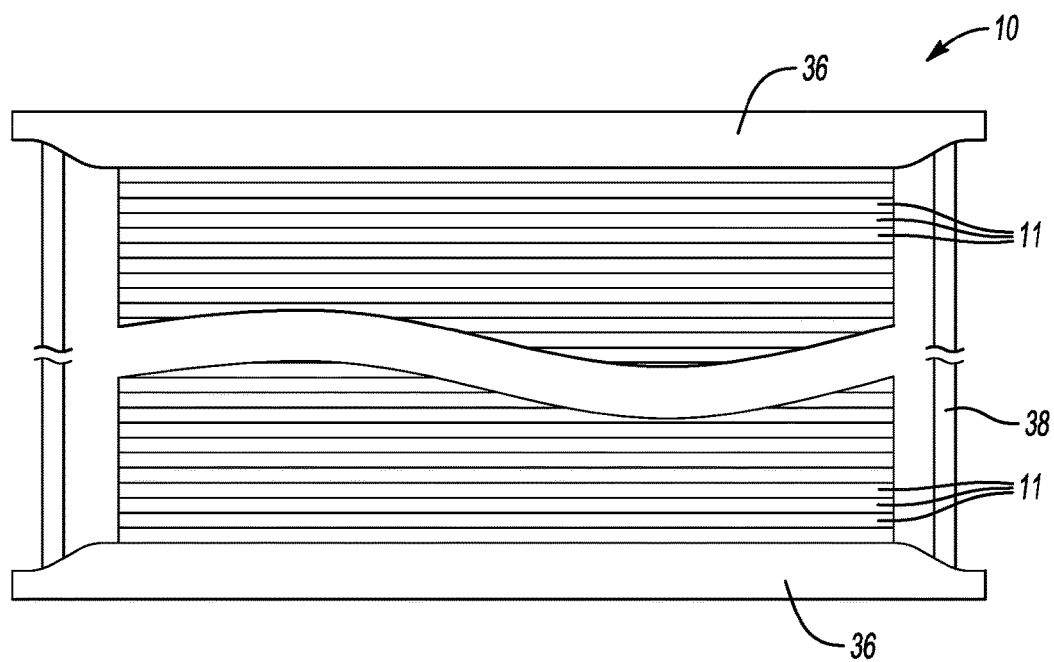
FIG. 3 is a schematic view of the fuel cell stack shown in FIGS. 1 and 2 arranged between spaced apart pressure plates.

A stack of cells 11 is arranged between spaced apart pressure plates 36, as is shown in FIG. 3. The cells 11 and their various components are maintained in tight sealing engagement with one another via a clamp load from the pressure plates 36. The clamp load is generated by one or more tie rod assemblies 38 arranged around the periphery of the fuel cell 10, for example, at four discrete ears.

Figure 4:
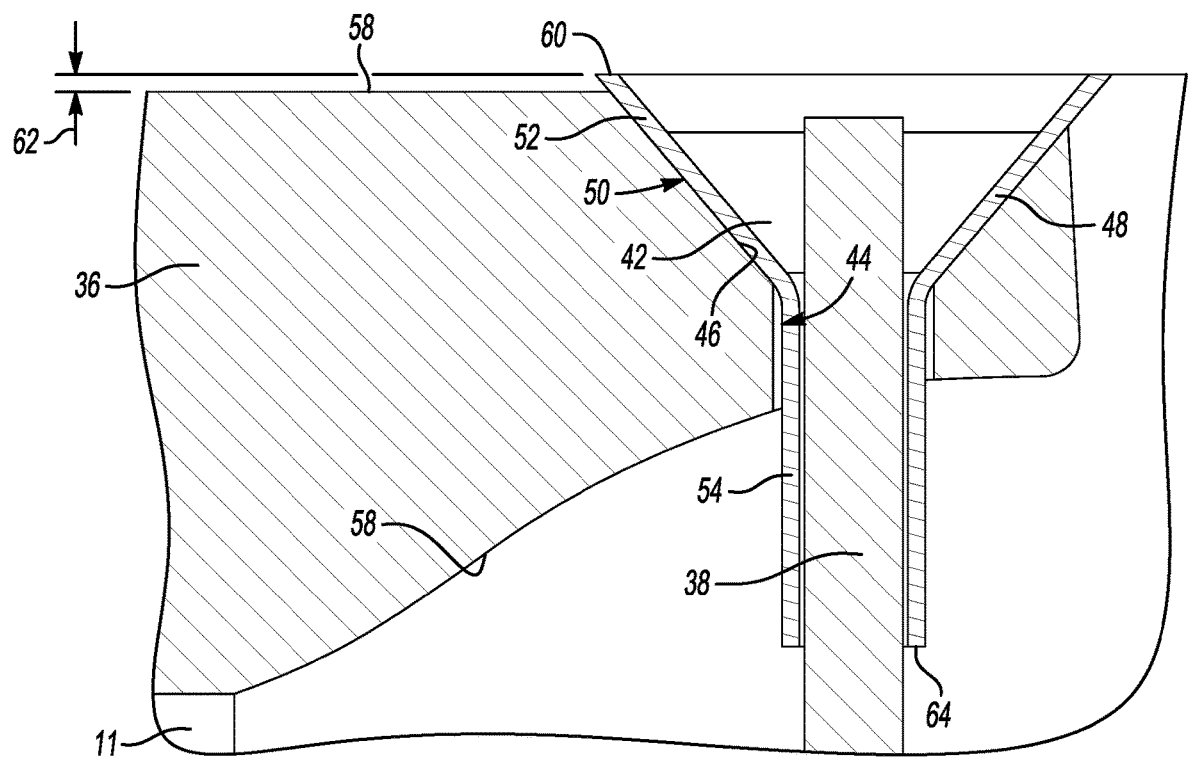
FIG. 4 is a cross-sectional view through a tie rod assembly.

One disclosed arrangement is illustrated in more detail in FIG. 4. The pressure plate 36 includes a hole 44 having a tapered surface 46. A tie rod assembly having a tie rod and at least one nut is used to secure the pressure plates 36 about the cells 11. In one example, the tie rod 38 has an end 40 that is threaded to receive a conical nut 42. The term "conical" in this disclosure includes spherical shapes as well.

An isolator 50, which may be a plastic such as PPS or PEEK, is configured to electrically isolate the tie rod assembly from the pressure plate 36. The isolator 50 is arranged between a conical surface 48 of the nut 42 and the pressure plate 36. The isolator 50 includes a conical portion 52 that engages a tapered surface 46 of the pressure plate 36 and the conical surface 48 of the nut engages the conical portion 52. The surfaces are arranged at the same angle as one another. This conical interface between the nut 42, isolator 50 at the hole 44 transfers the clamp load to the pressure plate 36.

The isolator 50 includes a cylindrical portion 54 integral with and extending from a narrow end of the conical portion 52. The tie rod 38 extends through the cylindrical portion 54 toward the opposing pressure plate (FIG. 3).

Figure 5:
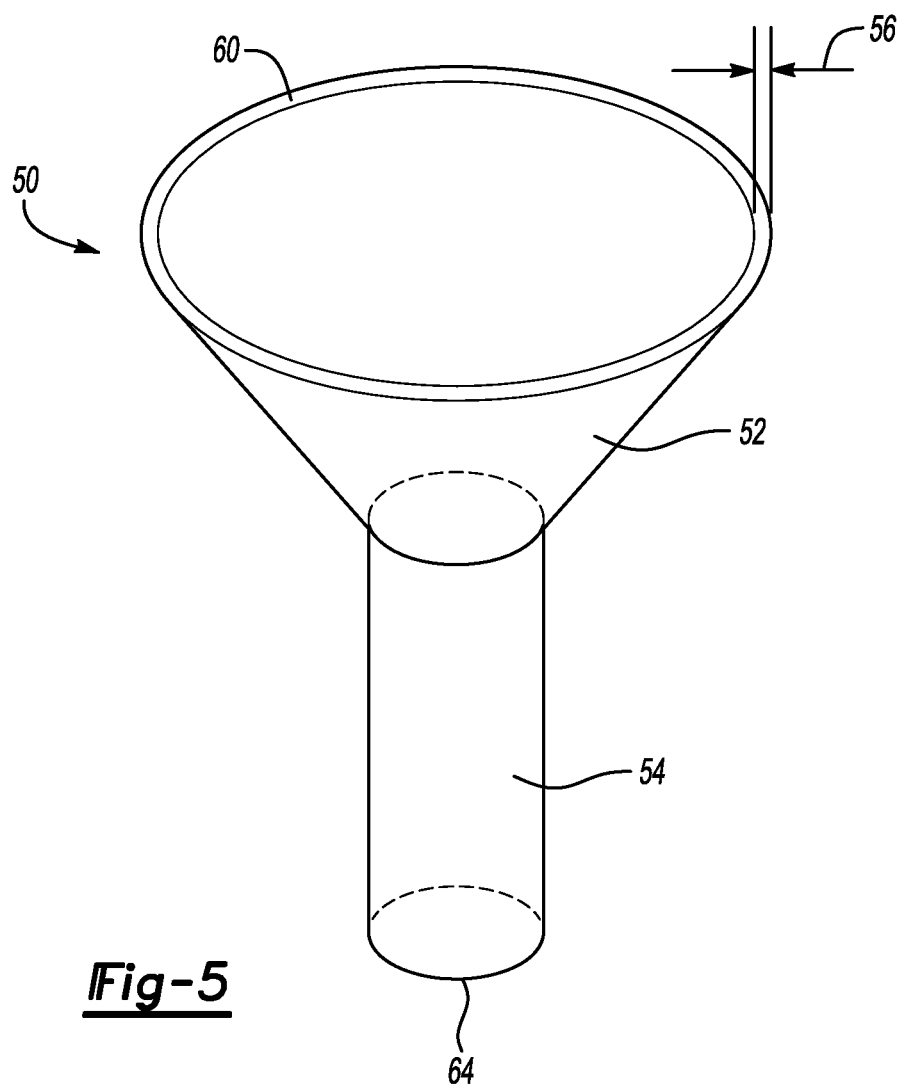
FIG. 5 is a perspective view of an example electrical isolator.

The isolator 50 includes dimensional characteristics that ensure sufficient electrical isolation during operation of the stack 10. For example, the conical portion 52 has a thickness 56 (FIG. 5) sufficient to provide adequate electrical isolation between the tie rod assembly and the pressure plate 36. In the example, the thickness 56 is uniform in the conical portion 52.

The conical and cylindrical portions 52, 54 respectively include a conical portion terminal end 60 and a cylindrical portion terminal end 64. These portions are arranged to sufficiently isolate the pressure plate 36 from the tie rod assembly. To this end, at least one of the conical portion terminal end 60 and the cylindrical portion terminal end 64 extends from the hole 44 and beyond an exterior surface 58 to the pressure plate 36 to prevent arcing between the tie rod assembly and the pressure plate. The nut 42 is arranged interiorly or beneath the conical portion terminal end 64. In the example, the conical portion terminal end 60 extends a distance 62 beyond the outer face of the pressure plate 36. The cylindrical portion terminal end 64 extends from the hole 44 and beyond the exterior surface 58, circumscribing a portion of the exposed tie rod 38.

The disclosed isolator 50 and the tie rod assembly offer a low profile while also providing sufficient electrical isolation and clamp load. The isolator 50 is used at one or more locations on either or both of the pressure plates 36. Additional cells 11 may be used between the pressure plates 36 since use of the lower profile tie rod assembly and isolator frees up space within the fuel cell stack packaging envelope.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A fuel cell comprising:
a fuel cell stack;
a pressure plate arranged on one side of the fuel cell stack, wherein the pressure plate includes a hole;
a tie rod assembly having a tie rod received in the hole, and a nut with a conical surface secured to the tie rod; and
an isolator arranged in the hole between the tie rod assembly and the pressure plate, the isolator including a conical portion, the conical surface engaging the conical portion to provide a conical interface, the tie rod assembly applying a clamp load on the fuel cell stack via the conical interface, wherein the isolator includes a cylindrical portion extending from a narrow end of the conical portion and through the hole, the tie rod disposed in the conical and cylindrical portions, wherein the conical and cylindrical portions respectively include a conical portion terminal end and a cylindrical portion terminal end, at least one of the conical portion terminal end and the cylindrical portion terminal end extends from the hole and beyond an exterior surface of the pressure plate to provide electrical isolation between the tie rod assembly and the pressure plate.

2. The fuel cell of claim 1, wherein the conical portion engages the pressure plate in the hole.

3. The fuel cell of claim 1, wherein the both of the conical portion terminal end and the cylindrical portion terminal end extend from the hole and beyond an exterior surface of the pressure plate.

4. The fuel cell of claim 1, wherein the nut is arranged beneath the conical portion terminal end.

5. The fuel cell of claim 4, wherein the tie rod includes a threaded end secured to the nut, the nut is arranged interiorly of the conical portion terminal end.

6. The fuel cell of claim 1, wherein the isolator is plastic and is configured to provide electrical isolation between the tie rod assembly and the pressure plate.

7. The fuel cell of claim 1, comprising another pressure plate arranged on another side of the fuel stack assembly, the other pressure plate applying the clamp load on the fuel cell stack via the tie rod assembly.

8. A fuel cell comprising:
a fuel cell stack;
a pressure plate arranged on one side of the fuel cell stack, wherein the pressure plate includes a hole;
a tie rod assembly having a tie rod with a threaded end received in the hole, and a nut with a conical surface and secured to the threaded end, the tie rod assembly applying a clamp load on the fuel cell stack via the conical nut; and
an isolator arranged in the hole between the tie rod assembly and the pressure plate, the isolator including a conical portion, the conical surface engaging the conical portion to provide a conical interface.

9. The fuel cell of claim 8, wherein the isolator includes a cylindrical portion extending from a narrow end of the conical portion and through the hole, the tie rod disposed in the conical and cylindrical portions.

10. The fuel cell of claim 9, wherein the conical and cylindrical portions respectively include a conical portion terminal end and a cylindrical portion terminal end, at least one of the conical portion terminal end and the cylindrical portion terminal end extends from the hole and beyond an exterior surface of the pressure plate to provide electrical isolation between the tie rod assembly and the pressure plate.

11. The fuel cell of claim 10, wherein the both of the conical portion terminal end and the cylindrical portion terminal end extend from the hole and beyond an exterior surface of the pressure plate.

12. The fuel cell of claim 10, wherein the nut is arranged beneath the terminal end of the conical portion terminal end.

13. The fuel cell of claim 12, wherein the tie rod includes a threaded end secured to the nut, the nut is arranged interiorly of the conical portion terminal end.

14. The fuel cell of claim 8, wherein the isolator is plastic and is configured to provide electrical isolation between the tie rod assembly and the pressure plate.

15. The fuel cell of claim 8, wherein the conical portion engages the pressure plate in the hole.

16. The fuel cell of claim 8, comprising another pressure plate arranged on another side of the fuel stack assembly, the other pressure plate applying the clamp load on the fuel cell stack via the tie rod assembly.

* * * * *